(12) United States Patent
Berthold et al.

(10) Patent No.: US 8,722,802 B2
(45) Date of Patent: *May 13, 2014

(54) POLYETHYLENE MOULDING COMPOSITION

(75) Inventors: Joachim Berthold, Grassau (DE); Bernd Lothar Marczinke, Römerberg (DE); Diana Doetsch, Mainz (DE); Johannes-Gerhard Müller, Leinach (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/380,455

(22) PCT Filed: Jun. 24, 2010

(86) PCT No.: PCT/EP2010/003792
§ 371 (c)(1),
(2), (4) Date: Dec. 23, 2011

(87) PCT Pub. No.: WO2011/000497
PCT Pub. Date: Jan. 6, 2011

(65) Prior Publication Data
US 2012/0108752 A1    May 3, 2012

Related U.S. Application Data

(60) Provisional application No. 61/270,311, filed on Jul. 7, 2009.

(30) Foreign Application Priority Data

Jun. 30, 2009 (EP) .................................. 09008525

(51) Int. Cl.
*C08F 8/00* (2006.01)
*C08L 23/00* (2006.01)

(52) U.S. Cl.
USPC ............................................ 525/191; 525/240

(58) Field of Classification Search
USPC ...................................................... 525/191, 240
See application file for complete search history.

(56) References Cited

U.S. PATENT DOCUMENTS

| | | | |
|---|---|---|---|
| 4,447,587 A | 5/1984 | Berthold et al. | |
| 6,441,096 B1 * | 8/2002 | Backman et al. | 525/240 |
| 6,713,561 B1 | 3/2004 | Berthold | |
| 7,807,770 B2 | 10/2010 | Lambert | |
| 2009/0105422 A1 * | 4/2009 | Berthold et al. | 525/240 |

FOREIGN PATENT DOCUMENTS

| | | |
|---|---|---|
| EP | 0068257 | 4/1985 |
| EP | 0401776 | 12/1990 |
| WO | WO-9118934 | 12/1991 |
| WO | WO-0123446 | 4/2001 |

OTHER PUBLICATIONS

Grubisic, Z., "A Universal Calibration for Gel Permeation Chromatography", Polymer Letters, vol. 5 Centre de Recherches sur les Macromolecules May 22, 1967, 753-759.

* cited by examiner

*Primary Examiner* — Nathan M Nutter

(57) ABSTRACT

A novel polyethylene composition is described. The composition is suitable for manufacturing especially stretched bands or tapes, also coined raffia in the art.

22 Claims, 1 Drawing Sheet

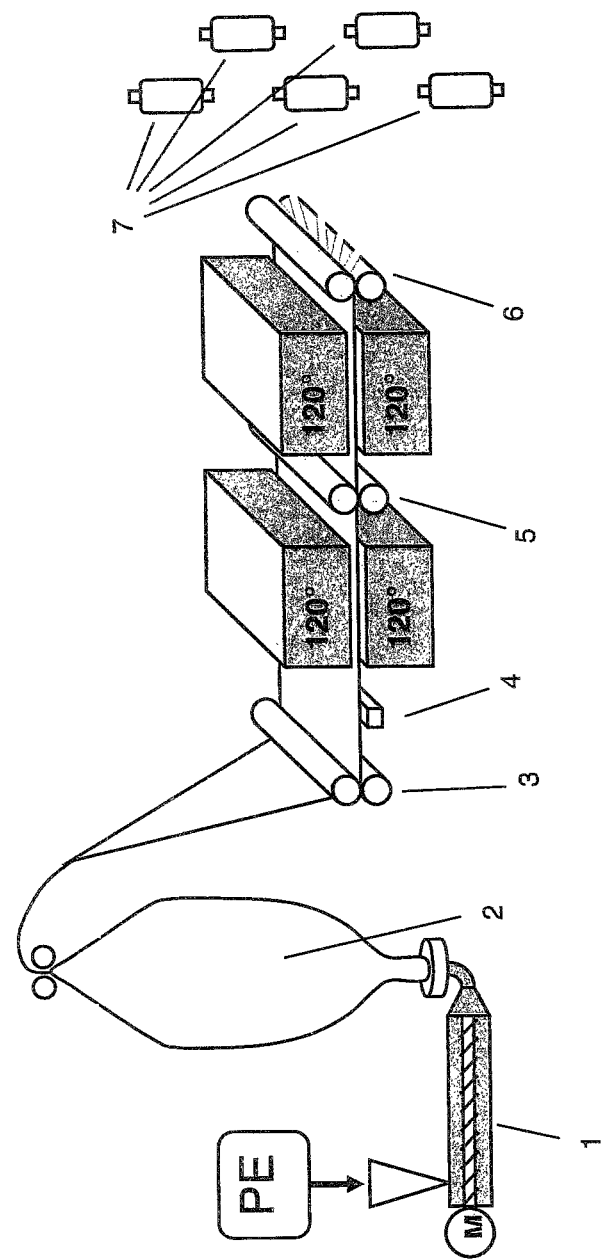

POLYETHYLENE MOULDING COMPOSITION

This application is the U.S. national phase of International Application PCT/EP2010/003792, filed Jun. 24, 2010, claiming priority to European Patent Application 09008525.9 filed Jun. 30, 2009, and the benefit under 35 U.S.C. 119(e) of U.S. Provisional Application No. 61/270,311, filed Jul. 7, 2009; the disclosures of International Application PCT/EP2010/003792, European Patent Application 09008525.9 and U.S. Provisional Application No. 61/270,311, each as filed, are incorporated herein by reference.

FIELD OF THE INVENTION

The present invention concerns a polyethylene moulding composition having multimodal molecular weight distribution, and foils, raffia or tapes obtained by extrusion and stretching of the moulding composition. The invention also concerns a process for preparing the polyethylene moulding composition, using several stages of liquid, gas-phase or suspension polymerization, in the presence of a catalytic system comprising at least a Ziegler catalyst.

BACKGROUND OF THE INVENTION

Polyethylene is used in large quantities in the packaging industry for the production of films and sheets, because the material shows low weight while at the same time presenting a particularly high mechanical strength, resistance to corrosion in the presence of moisture/water and oxygen, and extremely reliable long-term durability. Furthermore, polyethylene has good chemical resistance and is especially suited for raffia-applications, such as nettings, decorative tapes and mono-axially stretched films.

It is important that polyethylene tapes intended for raffia applications possess good tensile strength and elongation at break, since the tapes are subjected to high strains and stresses, for example during the production of nettings. Nevertheless, polyethylene compositions known in the art often show low processability, and in particular a narrow stretching window when the polyethylene sheet is subjected to stretching. The "stretching window" is defined by the gap between the minimum and the maximum stretching ratio of a polyethylene foil or band, wherein the minimum stretching ratio is the value below which undesired lumps appear in the foil/bands, and the maximum stretching ratio is the value above which the foil or band tends to rip during processing. The wider the stretching window, the more processable a polymer moulding composition, with advantages in both the production and the use of the composition.

Therefore, it would be desirable to provide polyethylene moulding grades possessing, besides good mechanical properties such tensile strength and elongation at break, also a wider stretching window and an improved processability, which would allow a high output from the extruder and a broad range of possible stretching ratio.

SUMMARY OF THE INVENTION

The Applicant has found polyethylene moulding compositions having a multimodal molar mass distribution, able to provide foils and tapes with excellent mechanical properties and improved processability; the polyethylene moulding compositions of the invention comprise:

from 30 to 60% by weight of a low-molecular-weight copolymer A comprising ethylene and 1-butene, having a viscosity number $VZ_A$ ranging from 50 to 250 cm$^3$/g;

from 20 to 50% by weight of a high-molecular-weight copolymer B comprising ethylene and 1-butene, and from 5 to 25% by weight of an ultrahigh-molecular-weight copolymer C, comprising ethylene and 1-butene.

BRIEF DESCRIPTION OF THE DRAWINGS

FIG. 1 illustrates a polyethylene moulding composition extruded through an extruder 1, and then blown into a foil by means of a blower 2. The foil is passed over a first rotating cylinder 3, then cut in the flow direction into tapes by cutting means 4, followed by a heating chamber which is a stretching zone, and then passed over a second roller or cylinder 5. The stretched bands are then passed through a heated annealing zone to a third cylinder 6 and collected on a take-up reel 7.

Copolymer A is a low-molecular-weight copolymer, comprising ethylene and 1-butene, wherein the 1-butene content preferably ranges from 0.5 to 10% by weight of the copolymer, more preferably ranges of from 0.9 to 8% by weight, more preferably ranges from 1.1 to 5% by weight. Copolymer A may have a weight average molecular weight $M_w$ ranging from 50,000 to 150,000 g/mol, preferably from 90,000 to 120,000 g/mol.

Copolymer B is a high-molecular-weight copolymer of ethylene and 1-butene, The high-molecular-weight copolymer B comprises low proportions of 1-butene, preferably in the range of from 0.6% to 10% by weight m and more preferably of from 1 to 5%. Copolymer B may preferably have a weight average molecular weight $M_w$ ranging from 80,000 to 180,000 g/mol, more preferably from 100,000 to 150,000 g/mol Copolymer C is an ultra-high-molecular-weight copolymer of ethylene and 1-butene, preferably comprising low proportions of 1-butene, ranging from 0.3% to 3% by weight and more preferably from 0.5 to 1.5%. Copolymer C may preferably have a weight average molecular weight $M_w$ ranging from 130,000 to 230,000 g/mol, more preferably from 150,000 to 200,000 g/mol.

The polyethylene moulding compositions of the invention may be prepared by processes known in the art, such as liquid-phase, gas-phase or suspension polymerization, in one or more reactors. The composition of the invention may be prepared by polymerizing copolymers A-C in a cascade (as a reactor blend), or by preparing separately the three copolymers A, B, and C, and mixing them thereafter.

Viscosity number (VZ) values are directly measured according to ISO-1191:1975 by means of an Ubelhohe viscometer; VZ is a traditional name accepted by IUPAC (IUPAC compendium 1997), used synomymously to 'reduced viscosity'. In case of a reactor blend, the VZ of copolymers B and C furnished in situ to the polyethylene compositions of the invention and not allowing of direct measurement are to be determined indirectly according to the present invention as described in the following:

After the first polymerization stage, the viscosity number $VZ_1$ of the product obtained from the first reactor stage is equal to the apparent, directly measurable viscosity number $VZ_A$ of the low-molecular-weight copolymer A and, according to the invention, is in the range of 50 to 250 cm$^3$/g, preferably is in the range of 120 to 220 cm$^3$/g.

Viscosity number $VZ_B$ of the high-molecular-weight copolymer B, formed during the second polymerization stage according to the preferred process of production of the polyethylene moulding composition according to the invention, may be computed according to the following formula:

$$VZ_B = \frac{VZ_2 - w_1 \cdot VZ_1}{1 - w_1},$$

wherein $w_1$ [%] is the weight fraction of the low-molecular-weight copolymer A, formed in the first polymerization stage, compared to the total weight of the polyethylene moulding composition with bimodal molar mass distribution obtained from the second polymerization stage, and wherein $VZ_2$ is the viscosity number measured for the bimodal polyethylene moulding composition after the second polymerization stage. The calculated value for $VZ_B$ lies in the range of 100 to 300 cm$^3$/g, preferably from 150 to 250 cm$^3$/g.

Viscosity number $VZ_C$ of the ultra-high-molecular-weight copolymer C, produced during the third polymerization stage according to the preferred process of production of the polyethylene moulding composition according to the invention, may be computed according to the following formula:

$$VZ_C = \frac{VZ_3 - w_2 \cdot VZ_2}{1 - w_2},$$

wherein $w_2$ [%] notably is the combined weight fraction of the low-molecular-weight copolymer A and high-molecular-weight copolymer B, formed in the first and second polymerization stages, based on or by total weight of the polyethylene moulding composition with trimodal molar mass distribution as obtained from the third polymerization stage, and wherein $VZ_3$ is the apparent viscosity number directly measurable according to ISO-1191:1975 for the total trimodal polyethylene moulding composition after the third polymerization stage. The deduced, calculated value or in case of a classic blend, the measured value, for $VZ_C$ is in the range of from 200 to 890 cm$^3$/g, preferably of from 230 to 870 cm$^3$/g, according to the present invention.

The polyethylene moulding composition of the invention has preferably a density at 23° C. ranging from 0.940 to 0.955 g/cm$^3$, more preferably from 0.945 to 0.950 g/cm$^3$, wherein the density is measured according to ISO 1183.

The polyethylene moulding composition according to the invention may have a melt flow rate MFR (190° C./5 kg) ranging from 0.01 to 10 dg/min, preferably from 0.1 to 5 dg/min, more preferably from 1 to 3 dg/min, measured according to ISO 1133.

The intrinsic viscosity of the polyethylene moulding composition according to the invention preferably ranges from 1 to 10 cm$^3$/g, more preferably from 1 to 5 cm$^3$/g, and even more preferably from 2 to 3 cm$^3$/g.

The polyethylene moulding composition according to the invention has a broad, at least trimodal molecular weight distribution; the molecular weight distribution is preferably trimodal. Modality is determined by the positions of the peaks of a curve plotting the molecular weight of the molecules in the polyethylene moulding composition against their relative concentration. In the case of a trimodal polyethylene moulding composition, a curve on this plot shows 3 peaks at the positions of the average molecular weight of each of the fractions, or "modes" of the polyethylene moulding composition, formed in subsequent polymerization steps in a cascade polymerization process. Therefore, by "trimodal distribution" is meant a polyethylene having a trimodal molecular weight distribution curve, i.e. having at least three molecular weight peaks, or at least two points of inflection on one flank of a maximum, due to the presence of at least three polymer fractions having different molecular weights.

The polyethylene moulding composition of the invention may be prepared by processes known in the art, such as liquid-phase, gas-phase, or suspension polymerization, in one or more reactors.

Preferably, the at least trimodal polyethylene compositions are produced using reactor cascades, i.e. at least three polymerization reactors connected in series, wherein the polymerization of copolymer A occurs in the first reactor, the polymerization of copolymer B occurs in the second reactor in the presence of copolymer A, and the polymerization of copolymer B, having the highest molecular weight, occurs in the next reactor in the presence of copolymers A and B.

According to a preferred process, the polyethylene components are formed by polymerization of the monomer and comonomer in the presence of a highly active Ziegler catalyst comprising a transition metal compound and an organoaluminium compound.

The highly active Ziegler catalysts employed in the present invention have a lasting, long-term activity which makes it especially suitable for usage in cascaded reactions. A measure for their suitability is the efficient response to the presence of hydrogen and their high activity, which remains constant over a long period of from 1 to 8 hours. Specific examples of catalysts which may be suitably used to produce the polyethylene moulding composition of the invention are described in EP-A-0 532 551, EP-A-0 068 257 and EP-A-0 401 776, comprising the reaction product of magnesium alkoxides and transition-metal compounds of titanium, zirconium or vanadium, with an organometallic compound of a metal from groups I, II or III of the Periodic Table of the Elements. Suitable organoaluminium cocatalysts, well known in the art, are further referenced and described therein; trialkyl-aluminium compounds, such as triethylaluminium being preferred. A suitable catalyst system comprises the catalyst described in Example 2 of WO 91/18934, in association with a cocatalyst selected from mono, di and trialkyl-aluminium compounds.

The polymerization is preferably carried out in three stages, wherein the desired molar mass is obtained in each stage by the further presence of hydrogen and/or controlling the concentration hydrogen, respectively. The polyethylene moulding composition of the invention is preferably prepared by a multi-stage suspension polymerization in a, preferably continously operated, reactor cascade.

Therefore, a further object of the present invention is a process for the preparation of a polyethylene moulding composition as indicated above, comprising the polymerization of ethylene and 1-butene at a temperature ranging from 55 and 90° C., under a pressure of 0.2 to 0.6 MPa, in the presence of a highly active or high mileage Ziegler catalyst and optionally a cocatalyst, preferably an alumorganic cocatalyst, wherein the polymerization is carried out in three polymerization stages and the molecular weight of copolymers A, B and C formed in each stage is controlled by a defined, preset concentration of hydrogen. Preferably, the polymerisation is carried out in suspension, at least in the first reactor stage. The lower temperature range distinguishes the process of the present invention further from prior art cascaded processes employing Ziegler catalysts but for ultimately different types of finished products and mechanical manufacturing methods, respectively.

The polyethylene moulding composition according to the invention may further comprise additives, such as heat stabilisers, antioxidants, UV-absorbers, light protecting agents, metal deactivating agents, peroxide scavengers, or basic co-stabilisers in amounts of 0.001 to 10% by weight, preferably from 0.005 to 5%. Further additives may be chosen from fillers, reinforcing agents, softeners, lubricants, emulsifiers, pigments, optical agents, flame retardants, antistatic agents, foaming agents or combinations thereof in amounts ranging from 0.005 to 50% by weight, with respect to the total weight of the mixture.

The polyethylene moulding composition of the invention may be advantageously used for producing foils and tapes having excellent mechanical properties and improved processability. The moulding compositions of the invention may be extruded at a temperature ranging from 180 to 250° C. The treatment may be carried out either in a single-screw extruder with a smooth feed zone, or in a high performance extruder. The screws are typically decompression screws, with a length of 25 to 30 times their diameter. The decompression screws have an exit zone in which temperature differences of the melt are compensated and in which the relaxation strains caused by shearing can be reduced.

The extruded products may be blown to form foils; the obtained foils may be cut into bands or tapes, which subsequently undergo stretching and annealing, according to known processes.

According to a preferred treatment, as shown in FIG. 1, a polyethylene moulding composition of the invention is extruded through an extruder 1, and the obtained product is then blown into a foil by means of a blower 2. The foil is passed over a first rotating cylinder 3, also called draw-off roller, at a speed $v_1$, then cut in flow direction into tapes by cutting means 4, followed by a heating chamber (preferably at a temperature of around 120° C.) which is the stretching zone, and then passed over a second roller or cylinder 5, rotating at a higher speed $v_2$. From there, the stretched bands are passed through an again heated annealing zone to a third cylinder 6, also rotating at the speed $v_2$, and collected on take-up reel 7.

It is advantageous to use a suitable stretch ratio, wherein the stretch ratio is defined by the ratio of speeds $v_2$ to $v_1$, with $v_2 > v_1$, $v_2$ preferably being at least two times larger than $v_1$. The stretching ratio of a polyethylene foil or band is comprised within a "stretching window", defined by the gap between the minimum and the maximum values, wherein the minimum stretching ration is the value below which undesired lumps appear in the foil/bands, and the maximum stretching ratio is the value above which the foil or band tends to rip during processing. The polyethylene moulding composition of the invention show a broader stretching window than the compositions of the prior art, thus possessing enhanced processability for foils and bands. The inventive polyethylene moulding compositions may also be processed at lower temperature and pressure to obtain foils or bands.

The polyethylene moulding compositions of the invention also show superior values of tensile strength and elongation at break compared to the state of the art; tensile strength values up to 400 to 800 mN/tex may be achieved, depending on the stretching rations used, as measured according to ISO 527.

The polyethylene moulding compositions of the invention are particularly useful in raffia applications, such as bird netting, shade netting, Christmas tree netting, tubular netting, decorative tapes, round bale nettings.

The following analytical methods have been used to determine the properties reported in the description and in the examples:

$M_w$, $M_n$ and $M_w/M_n$ were measured with GPC by high-temperature gel permeation chromatography (GPC) using essentially the method described in DIN 55672-1:1995-02 (February 1995), with the following modifications: solvent 1,2,4-trichlorobenzene (TCB), temperature of apparatus and solutions 135° C. and as concentration detector a Polymer-Char (Valencia, Paterna 46980, Spain) IR-4 infrared detector, capable for use with TCB. A WATERS Alliance 2000, equipped with the following pre-column SHODEX UT-G and separation columns SHODEX UT 806 M (3×) and SHODEX UT 807 connected in series, was used. The solvent was vacuum distilled under $N_2$ and was stabilized with 0.025% by weight of 2,6-di-tert-butyl-4-methylphenol. The flow rate used was 1 ml/min, the injection was 500 µl and polymer concentration was in the range of 0.01%-0.05% w/w. The molecular weight calibration was established by using monodisperse polystyrene (PS) standards from Polymer Laboratories (now Varian, Inc., Essex Road, Church Stretton, Shropshire, SY6 6AX,UK), in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753 (1967)). The Mark-Houwing parameters used were for PS: $k_{ps}$=0.000121 dl/g, $\alpha_{ps}$=0.706 and for PE $k_{pe}$=0.000406 dl/g, $\alpha_{pe}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim) respectively.

The comonomer content was determined by means of IR in accordance with ASTM D 6248-98

MFR values were measured according to ISO 1133, at 190° C./5 kg or 190° C./21.6 kg.

Density was measured according to ISO 1183.

Elongation at break and tensile strength were measured according to ISO 527.

The following examples illustrate the invention without restricting the scope thereof:

EXAMPLE 1

Preparation of Polyethylene Moulding Composition

Ethylene and 1-butene were polymerized in a continuous process, using three 500 L reactors in cascade. The first reactor was loaded with Ziegler catalyst, hexane as suspension agent, ethylene, hydrogen and 1-butene. As a Ziegler catalyst, the catalyst described in Example 2 of WO 91/18934, having the operational number of 2.2, was used. Triethylaluminium was continuously supplied as a cocatalyst to the first reactor, in a ratio Ziegler:Cocatalyst of 1:13.5 (mol/mol).

Hydrogen (229 NL/h), ethylene (55.2 kg/h) and 1-butene (168 kg/h) plus hexane (221 L/h) were provided to the first reactor such that the gas phase above the suspension contained 50% by volume of ethylene, 35% by volume of hydrogen and about 2% (1.85%) by volume of 1-butene. Polymerization in the first reactor was carried out at a temperature of 72° C., at a pressure of 0.49 MPa.

From the first reactor, the suspension was continuously supplied to a second reactor through a flash vessel in which the pressure was reduced to 0.41 MPa and the temperature was 71° C. Flashing allowed of better controlling the hydrogen concentration in the next reactor step, by transiently reducing the pressure in the connecting flash vessel.

Hydrogen (118 NL/h), ethylene (45.6 kg/h), no 1-butene but hexane (233 L/h) were supplied to the second reactor such that the gas phase above the suspension contained 63% by volume of ethylene, 25% by volume hydrogen, and about 1% by volume 1-butene. No fresh 1-butene was supplied to the second reactor; the 1-butene present was a carry over from the first reactor step. The composition of the gas phase was continuously measured online and the supply of gas was adjusted accordingly. The polymerization in the second reactor was carried out at a temperature of 80° C., under a pressure of 0.51 MPa.

From the second reactor, the suspension was continuously supplied to a third reactor through a flash pipe, in which the pressure was reduced to 0.33 MPa and the temperature was 75° C. The pressure release in the flash pipe was again carried out in order to reduce and better control the amount of hydrogen in the system.

Hydrogen (21 NL/h), ethylene (19.2 kg/h), again no 1-butene but hexane (26 L/h) were supplied to the third reactor such that the gas phase above the suspension contained 82% by volume ethylene, 9% by volume hydrogen and about 0.5% by volume 1-butene. No fresh 1-butene was supplied to the third reactor. The adjustment of the addition of gas was again achieved by continuous online measurement of the composition of the gas phase and by adjusting the gas supply accordingly. Polymerization in the third reactor was carried out at a temperature of 60° C., and under a pressure of 0.52 MPa.

The polymer suspension formed in the third reactor was collected and, after removal of the suspension agent hexane by a centrifuge step, the product was dried. The properties of the composition thus obtained are reported in Table 1.

EXAMPLE 2

Comparative

Exp. is a typical commercial prior art product, which is a monomodal Ziegler product obtained in a single reactor step. Its essential physical characteristics, as on display in Table 1, are closely similar to the product according to the invention obtained in example 1 also shown in that table.

TABLE 1

| | | Example 1 | Example 2 (comparative) |
|---|---|---|---|
| MFR (190/5) | g/10 min | 1.82 | 1.92 |
| MFR (190/21.6) | g/10 min | 22.8 | 25.0 |
| FRR (21.6/5) | — | 12.5 | 13.1 |
| Density | g/cm$^3$ | 0.948 | 0.9465 |
| $M_w$ | g/mol | 181700 | 185500 |
| $M_n$ | g/mol | 19400 | 17300 |
| $M_w/M_n$ | — | 9.4 | 10.9 |
| Intrinsic viscosity | ml/g | 2.56 | 2.33 |

EXAMPLE 3

Processing of Polyethylene Moulding Compositions

The polymer compositions obtained in Examples 1 and 2 were supplied to a single-screw extruder and film-blown in a first step into a foil at the melt temperature and pressure indicated in Table 2.

The foil so obtained was rolled over a first cylinder at a constant speed, first cylinder rotating at 50 rpm, and then cut into parallel bands whilst being continously transported on. The bands were heated to 120° C. (cp FIG. 1), and rolled over a second cylinder rotating at a higher speed than the first one, in order to achieve stretching. The speed of the second cylinder was adjusted in order to obtain an appropriate stretching ratio (SR). The minimum stretch ratio was determined by visual assessment of the obtained tapes. At stretch ratios below the minimum stretch ratio, fish-eyes (bumps) were detected in the tapes. The minimum stretch ratio was determined as the lowest stretch ratio at which no fish-eyes could be detected and a smooth and consistent tape thickness was obtained. The maximum stretch ratio was determined as the stretch ratio at which the tapes started to rip. Table 2 indicates the stretchable output, which is the measure of the amount of polyethylene composition that may be treated per unit time using the apparatus.

The mechanical testing of the obtained bands was carried out at stretching ratios (SR) of 6:1, 7:1 and 8:1, all falling within the desired stretch window formed by the minimum stretch ration and maximum stretch ratio.

TABLE 2

| | | Example 1 | Example 2 (comparative) |
|---|---|---|---|
| Extrusion at 50 r.p.m. | | | |
| Output | kg/h | 80 | 78 |
| Melt temperature | ° C. | 274 | 271 |
| Melt pressure | Bar | 180 | 170 |
| Fisheye rate (Size) | — | 4.5 | 4.5 |
| Abrasion - Dust | Note | 1.0 | 1.0 |
| Tape stretching | | | |
| Stretchable output | kg/h | 87 | 84 |
| Melt temperature | ° C. | 279 | 274 |
| Melt pressure | Bar | 185 | 174 |
| Min./Max. stretch ratio | — | 5.9/8.4 | 6.0/8.86 |
| Tape mechanical properties | | | |
| SR = 6:1 Titre | Tex | 62 | 64 |
| SR = 6:1 Tensile strength | mN/tex | 411 | 372 |
| SR = 6:1 Elongation at break | % | 48 | 48 |
| SR = 7:1 Titre | Tex | 53 | 56 |
| SR = 7:1 Tensile strength | mN/tex | 493 | 455 |
| SR = 7:1 Elongation at break | % | 32 | 29 |
| SR = 8:1 Titre | Tex | 47 | 48 |
| SR = 8:1 Tensile strength | mN/tex | 608 | 569 |
| SR = 8:1 Elongation at break | % | 21 | 19 |

Table 2 represents a comparison between the inventive polyethylene moulding composition (Exp.1) and the state of the art (Comp. Exp.2). It can be seen that at a standard treatment, wherein the first cylinder rotates at 50 rpm, the output of the inventive polyethylene moulding composition is higher compared to the state of the art, under equivalent temperature and pressure conditions. This shows enhanced processability of the compositions of the invention.

The measured mechanical properties show improved results for tensile strength and elongation at break for the inventive polyethylene moulding compositions, compared to the state of the art; this applies to all the tested stretch ratios of 6:1, 7:1 and 8:1.

The invention claimed is:

1. A polyethylene moulding composition having a multimodal molar mass distribution, comprising:
   from 30 to 60%, by weight of a low-molecular-weight copolymer A comprising ethylene and 1-butene, having a viscosity number $VZ_A$ in the range of from 50 to 250 cm$^3$/g as determined according to ISO-1191:1975;
   from 20 to 50%, by weight of a high-molecular-weight copolymer B comprising ethylene and 1-butene; and
   from 5 to 25%, by weight of an ultrahigh-molecular-weight copolymer C comprising ethylene and 1-butene.

2. The polyethylene moulding composition according to claim 1, wherein copolymer B has a viscosity number $VZ_B$ ranging from 100 to 300 cm$^3$/g.

3. The polyethylene moulding composition according to claim 1, wherein copolymer C has a viscosity number $VZ_C$ ranging from 200 to 890 cm$^3$/g.

4. The polyethylene moulding composition according to claim 1 having a density ranging from 0.945 and 0.955 g/cm$^3$, measured according to ISO 1183.

5. The polyethylene moulding composition according to claim 4, wherein the density ranges from 0.947 to 0.950 g/cm$^3$.

6. The polyethylene moulding composition according to claim 1 having a melt flow ratio (190° C./5 kg, measured according to ISO 1133) ranging from 0.01 and 10 g/10 min.

7. The polyethylene moulding composition according to claim 6, wherein the melt flow ratio ranges from 1 to 2 g/10 min.

8. The polyethylene moulding composition according to claim 1 having a tensile strength ranging from 400 to 800 mN/tex, as measured according to ISO 527.

9. A process for the preparation of a polyethylene moulding composition comprising the step of polymerizing ethylene and 1-butene at a temperature ranging from 55 and 90° C., under a pressure of 0.2 to 0.6 MPa, in the presence of a Ziegler catalyst, wherein the polymerization is carried out in three polymerization stages,
   wherein the molar mass of the polyethylene formed at each stage is controlled by adjusting the hydrogen concentration in the reactor, and
   wherein the process for the preparation of the polyethylene moulding composition produces a polyethylene moulding composition having a multimodal molar mass distribution, comprising:
      from 30 to 60%, by weight of a low-molecular-weight copolymer A comprising ethylene and 1-butene having a viscosity number $VZ_A$ in the range of from 50 to 250 cm$^3$/g as determined according to ISO-1191:1975;
      from 20 to 50%, by weight of a high-molecular-weight copolymer B comprising ethylene and 1-butene; and
      from 5 to 25%, by weight of an ultrahigh-molecular-weight copolymer C comprising ethylene and 1-butene.

10. The process according to claim 9, wherein at least one of the polymerization stages is carried out in suspension.

11. The process according to claim 10, wherein all the polymerization stages are carried out in suspension or wherein at least the first and second reactor stage are carried out in suspension while the last reactor stage yielding the ultrahigh-molecular weight copolymer C is carried out in gas phase.

12. A process comprising producing an article comprising a polyethylene moulding composition, wherein the process comprises mon- or biaxial-stretching the moulding composition at a temperature greater than 100° C. but below the melting temperature, and after moulding or extruding said moulding composition in a preceding step, the article being selected from foils, raffia, tapes bands, bird nettings, shade nettings, Christmas tree nettings, tubular netings, decorative tapes and round bale nettings and
   wherein the polyethylene moulding composition has a multimodal molar mass distribution and comprises:
      from 30 to 60%, by weight of a low-molecular-weight copolymer A comprising ethylene and 1-butene having a viscosity number $VZ_A$ in the range of from 50 to 250 cm$^3$/g as determined according to ISO-1191:1975;
      from 20 to 50%, by weight of a high-molecular-weight copolymer B comprising ethylene and 1-butene; and
      from 5 to 25%, by weight of an ultrahigh-molecular-weight copolymer C comprising ethylene and 1-butene.

13. The process according to claim 12, wherein the foils, raffia, tapes or bands have a tensile strength ranging from 400 and 800 mN/tex, measured according to ISO 527.

14. An article selected from a foil, raffia, tape or band comprising a polyethylene moulding composition having a multimodal molar mass distribution, comprising:
   from 30 to 60%, by weight of a low-molecular-weight copolymer A comprising ethylene and 1-butene having a viscosity number $VZ_A$ in the range of from 50 to 250 cm$^3$/g as determined according to ISO-1191:1975;
   from 20 to 50%, by weight of a high-molecular-weight copolymer B comprising ethylene and 1-butene; and
   from 5 to 25%, by weight of an ultrahigh-molecular-weight copolymer C comprising ethylene and 1-butene.

15. A polyethylene moulding composition having a trimodal molar mass distribution, comprising:
   from 30 to 60% by weight of a low-molecular-weight copolymer A comprising ethylene and 1-butene, having a viscosity number $VZ_A$ in the range of from 50 to 250 cm$^3$/g as determined according to ISO-1191:1975;
   from 20 to 50% by weight of a high-molecular-weight copolymer B comprising ethylene and 1-butene; and
   from 5 to 25% by weight of an ultrahigh-molecular-weight copolymer C comprising ethylene and 1-butene.

16. The moulding composition of claim 15 comprising 40 to 50% by weight of copolymer A, 30 to 40% by weight copolymer B, and 10 to 24% by weight of copolymer C.

17. The moulding composition of claim 1 comprising 40 to 50% by weight of copolymer A, 30 to 40% by weight copolymer B, and 10 to 24% by weight of copolymer C.

18. The polyethylene moulding composition according to claim 3, wherein copolymer C has a viscosity number $VZ_C$ ranging from 230 to 870 cm$^3$/g.

19. The polyethylene moulding composition according to claim 18, wherein copolymer C has a viscosity number $VZ_C$ ranging from 250 to 600 cm$^3$/g.

20. The polyethylene moulding composition according to claim 3, wherein copolymer C has a viscosity number $VZ_C$ ranging from 650 to 870 cm$^3$/g.

21. The process of claim 9 carried out in the presence of a Ziegler catalyst and a cocatalyst.

22. The process according to claim 21 wherein the cocatalyst is an organoaluminium compound.

* * * * *

UNITED STATES PATENT AND TRADEMARK OFFICE
CERTIFICATE OF CORRECTION

PATENT NO.       : 8,722,802 B2
APPLICATION NO.  : 13/380455
DATED            : May 13, 2014
INVENTOR(S)      : Joachim Berthold et al.

It is certified that error appears in the above-identified patent and that said Letters Patent is hereby corrected as shown below:

In the specification
| | | |
|---|---|---|
| Column 2 | Line 53 | Delete "synomymously" and insert --synonymously-- |
| Column 4 | Line 47 | Delete "continously" and insert --continuously-- |
| Column 7 | Line 60 | Delete "continously" and insert --continuously-- |

In the claims
| | | |
|---|---|---|
| Column 9  | Line 50 | In Claim 12, delete "mon" and insert --mono-- |
| Column 9  | Line 55 | In Claim 12, delete "netings," and insert --nettings,-- |
| Column 9  | Line 55 | In Claim 12, after "nettings", insert --,-- |
| Column 10 | Line 19 | In Claim 14, after "butene", insert --,-- |
| Column 10 | Line 38 | In Claim 16, after "weight", insert --of-- |
| Column 10 | Line 41 | In Claim 17, after "weight", insert --of-- |

Signed and Sealed this
Twenty-second Day of March, 2016

Michelle K. Lee
*Director of the United States Patent and Trademark Office*